United States Patent Office 3,795,514
Patented Mar. 5, 1974

3,795,514
DEFORMATION IMAGING METHOD
Alex E. Jvirblis, La Jolla, and John C. Urbach, Portola Valley, Calif., assignors to Xerox Corporation, Stamford, Conn.
Continuation-in-part of abandoned application Ser. No. 874,181, Nov. 5, 1969. This application Sept. 15, 1972, Ser. No. 289,504
Int. Cl. G03g 13/00
U.S. Cl. 96—1.1
14 Claims

ABSTRACT OF THE DISCLOSURE

The method of amplifying deformation images wherein a deformation imaging member having a softenable deformation imaging surface material is softened in an electric field whereby the vertical distance between the peaks and valleys of the deformations is increased.

CROSS-REFERENCE TO RELATED CASES

This application is a continuation-in-part application of prior copending application Ser. No. 874,181, filed Nov. 5, 1969, now abandoned.

BACKGROUND OF THE INVENTION

This invention relates in general to imaging and more specifically to deformation imaging and thermoplastic deformation imaging.

There has recently arisen widespread interest in techniques for recording images on deformable layers by the combined application of an electrostatic field and softening the deformation material. Thermoplastic materials have been found particularly suitable for this technique. This process or technique has therefore been named deformation imaging or thermoplastic deformation imaging. Typically, deformation imaging comprises applying an electrostatic latent image or charge pattern to an insulating softenable layer or film which is softened by the application of either heat or a vaporous solvent or a combination of both. While the softenable layer is in its softened condition, the electric field forces in the electrostatic latent image or charge pattern deform the softenable material in an imagewise pattern corresponding to the electrostatic latent image previously induced in the imaging member. The softenable layer is then allowed to reharden to permanently preserve the deformation image. Similarly, liquids or any other softenable material may be suitable for use in deformation imaging.

Presently, deformation images are typically produced by at least two well-known techniques. These techniques are "relief" imaging and "frost" imaging, and the images produced from these systems are respectively known as "relief" images and "frost" images. Relief imaging is particularly useful for line images or for screened, continuous tone images because the relief imaging system is based on potential differences or gradients across the surface of the softenable deformation imaging layer. Relief imaging is described in Glenn Pat. 3,113,179, in copending application Ser. No. 476,533, filed Aug. 2, 1965, now U.S. Pat. No. 3,436,216 and in Gundlach and Claus, "A Cyclic Xerographic Method Based on Frost Deformation," Photographic Science and Engineering, vol. 7, No. 1, pages 14–19, January-February 1963. Relief imaging is typically performed on an imaging member comprising a thin plastic insulating layer on a substrate. An electrostatic latent image can be formed on the surface of the thermoplastic layer by any one of a variety of means, such as masked charging or breakdown transfer techniques as described in U.S. Pats. 2,982,647 and 2,825,814, or by the "TESI" discharge technique described in U.S. Pats. 3,023,- 731 and 2,919,967. It will be understood that if the charge density in the thermoplastic layer is uniformly distributed across the surface of said layer, the attractive forces in a unit area of said surface are everywhere equal and such forces are normal to the surface of the softenable layer. At such uniformly charged areas in the thermoplastic layer, said layer is under stress, but strains resulting from said stress will not be exhibited by said layer until it is softened by some method such as heat or solvent vapor. However in contrast to areas where the softenable layer is uniformly charged, in electrostatically latently imaged areas, the charge density will be different in adjacent areas of the softenable layer, and the adjoining edges of such areas may be called charge boundaries. In areas of such potential gradients, the stresses in the softenable layer will be acting in directions other than and in addition to the direction normal to the surface of the softenable layer. At such charge boundaries in the softenable layer, there exists not only electric vectors having lateral components, but also gradients in fluid pressure. Therefore, when the softenable layer is electrostatically latently imaged with various adjacent areas of non-uniform charge density (therefore also having charge boundaries), upon softening of the softenable layer, the surface of said softenable layer deforms at such boundaries producing what is termed a "relief" image. Once the relief deformation image is formed on the surface of a deformation imaging member, said image is fixed by allowing or causing the softened deformation layer to reharden. The rehardening may be allowed to occur naturally by removing the heat or vaporous solvent medium used to soften the deformation layer, or, by affirmatively cooling the softenable material to a temperature below its freezing point. Because relief image deformations typically occur only at the edges of areas of different charge densities in electrostatic latent images, relief imaging has typically been more suitable for high contrast subjects such as line copy rather than continuous tone imaging. However, recently relief imaging has been adapted to continuous tone imaging by a screened continuous tone relief imaging system as described for example in Urbach Pat. 3,436,216, in Urbach, J. C., "The Role of Screening in Thermoplastic Xerography," Photographic Science and Engineering, vol. 10, No. 5, September-October 1966, and Gaynor Pat. 3,291,601.

"Frost" imaging is more suitable to continuous tone reproduction because imaged areas are characterized by a "frost" of very small surface folds or wrinkles on the surface of the softenable layer in the deformation imaging member. Frost imaging is described by Gundlach and Claus, supra, in Mihajlov et al. 3,196,008, and in Gunther et al. 3,196,011. One typical method of producing frost or relief images is by imaging on a xerographic plate which is overcoated with the softenable deformation layer. This combination imaging member is then charged by a corona charging device while the conductive substrate of the xerographic plate is electrically grounded. The charging creates an electric field across the thickness of the softenable layer as well as across the photoconductive layer.

The charged member can then be exposed to a light-and-shadow image pattern to produce an electrostatic latent image on the member having charged areas corresponding to the dark areas of the light-and-shadow image to which the imaging member was exposed. Where the imaging member was originally positively charged, exposure to a light-and-shadow image is believed to selectively induce negative charge to the interface between the softenable overcoating and the photoconductive layer of the xerographic plate. The imaged member may then be exposed to an alternating corona charge device which neutralizes or in effect grounds the surface of the imaging member. The negative charges, previously trapped at the interface between the softenable layer and the photoconductive layer, then retain positive charges on the free surface of the imaging member in an image pattern corresponding to the negative charges trapped at the aforementioned interface. The field created across the softenable layer by the charges so held on each surface of the softenable layer create the conditions suitable for frost formation in such charged areas. The softenable layer is then softened by any suitable means such as heat or solvent vapors, and when the optimum frost deformation image has appeared, the softening medium is removed and the viscosity of the softenable layer increases quickly thereby capturing the frost image upon the surface of the softenable layer. The frost deformation imaging technique reproduces large solid dark areas and small degradation differences in tone quite accurately in good, continuous tone reproductions of the desired image.

When a deformation image is no longer useful, it has been found possible to erase such images by simply resoftening the softenable layer and maintaining said layer at its softened, low viscosity for a period of time sufficient to allow the deformation image to dissipate. The imaged deformation imaging member is believed to discharge by fluid migration of the ions making up the charge pattern from the top surface of the deformed layer while it is still soft during initial deformation. Surface tension forces also help restore the smooth film surface upon resoftening, so that said surface is ready for reuse in a deformation imaging system.

Although relief and frost deformation imaging have been described above in conjunction with a specific deformation imaging member configuration, it will be understood that a deformation imaging member may take on various embodiments depending upon the desired use and system, and that such a deformation imaging member may consist of nothing more than a single layer of softenable, deformation imaging material. Deformation imaging typically simply includes a softenable layer of deformation imaging material carrying an electrostatic latent image comprising areas of different charge densities, and softening said layer sufficiently to allow flowing deformation of the surface of said imaging member, which is promoted by stresses resulting from the presence of electrical charges within an electrical field across the softenable layer of the deformation imaging member. It will be appreciated that an electrical field may be created across the softenable layer of the deformation imaging member by any number of means, for example, by double-sided charging, by a parallel plate capacitor, or by single-sided charging of a softenable deformation imaging layer in contact with a conductive electrode, or by various combinations of such charging methods. It will also be understood that the deformation imaging processes are not absolutely dependent upon the charge polarities used in the specific embodiments of said processes as described above. Rather, either polarity will work so long as the appropriate polarity differences are maintained during the various process steps.

It should also be appreciated that deformation-type images such as those produced by the processes described above may be produced by any means which provides an imagewise deformation of the surface of a deformation imaging member. For example, deformation-type images may be produced by mechanical casting, embossing or pressing processes, by engraving or even by etching.

The deformation imaging material in a deformation imaging member is typically a layered configuration. It has been found that deformation images may be produced on deformation imaging layers of thicknesses in a range between about ½ micron to greater than about 100 microns. A variety of materials suitable for such softenable layers in deformation imaging members are described in U.S. Pats. 2,943,147, 3,113,179, 3,196,008, 3,196,011, 3,238,041 and 3,291,601. Thicknesses suitable for preferred deformation imaging with various processes may vary from one material to another. It has also been found that certain materials are suitable primarily for frost imaging, and other suitable primarily for relief imaging. However, certain materials have characteristics over a range of deformation imaging conditions which make them suitable for use in either frost or relief imaging processes.

Deformation images typically produced by one of the methods described above are usually not visible to the naked eye. Many deformation images are barely visible in magnification equipment such as a phase contrast microscope, and some are totally invisible in either bright or dark field microscopy.

Phase contrast microscopy or dark field microscopy is typically the best way of observing deformation images. In some cases ordinary photographic projection equipment may be used wherein the deformation image is used as a slide transparencey, and the imaged areas diffuse, reflect, and otherwise modulate the the passage of the projecting light beam, thereby forming an image on the projection screen corresponding to that on the deformation image transparency. Schlieren optical systems may also be used to observe deformation images. However, the light deflection and scattering caused by the image deformations in strongly deformed frost deformation images may obviate the practicability of such a sensitive system.

With images of such minute image deformation amplitudes, the image may not be of sufficient magnitude to be useful in certain applications. For example, such images may not be visible even with certain projection systems, or the image amplitude may not be high enough for applications such as using deformation images as gravure printing masters.

Additionally, where the electric field is created across the deformation imaging member by uniformly charging said member, some otherwise desirable imaging thermoplastics exhibit electrical conductivity which is sufficiently high to produce substantial discharge of the applied uniform charge before adequate deformation amplitude may be obtained in the original deformation imaging process. Where such materials are used it is useful to fix (i.e., by cooling the thermoplastic) the deformation image that is obtained. However, the obtained image may not be of sufficient magnitude to be as useful as images created by other systems using other materials which do not exhibit the conductivity of the thermoplastic as discussed above.

Also, certain mechanical processes now used for reproducing deformation images, such as hot stamping of thermoplastic deformation imaging members, may be enhanced by producing lower relief deformations on the desired copies and thereby reducing the wear and tear on the dies. The magnitude of deformation images produced by this system is originally not as great as the magnitude of deformation images formerly produced by the same system, however such deformation images may be enhanced by an appropriate deformation image amplification system.

SUMMARY OF THE INVENTION

It is, therefore, an object of this invention to provide a method of deformation imaging which overcomes the above-noted deficiencies and satisfies the above-noted needs.

It is another object of this invention to provide a method of amplification of deformation images.

It is anoter object of this invention to provide a method of vertically amplifying the folds or wrinkles comprising a deformation image while maintaining the same number of folds per unit area; i.e. maintaining the same number of lines per unit length in the imaged areas.

It is another object of this invention to provide a method of noiseless amplification of deformation images.

It is another object of this invention to provide a method of softening an imaged deformation imaging member without destroying the deformation image thereon.

It is yet another object of this invention to provide an improved deformation image gravure printing master.

It is yet another object of this invention to provide a method for increasing the useful photographic speed of deformation electrophotographic materials.

It is still another object of this invention to provide a deformation image amplification system capable of amplifying the deformation image without frost imaging previously non-imaged areas of the imaging member.

It is still another object of this invention to provide a deformation imaging system which provides an informational output of greater magnitude than previous deformation imaging systems.

The foregoing objects and others are accomplished in accordance with the deformation image amplification system of the present invention wherein an imaged deformation imaging member is provided in a suitable electric field and said member is softened by a suitable medium whereby the deformation image is redeveloped and the amplitude of the folds of wrinkles comprising said image is increased.

BRIEF DESCRIPTION OF THE DRAWINGS

For a better understanding of the invention as well as other objects and further features thereof, reference is made to the following detailed disclosure of the preferred embodiments of this invention taken in conjunction with the accompanying drawings thereof, wherein.

DESCRIPTION OF THE PREFERRED EMBODIMENTS

Figure 1A:
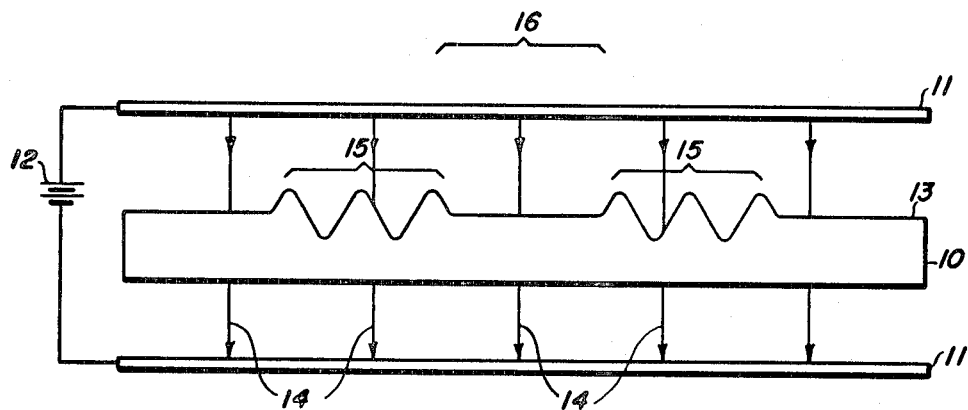
FIG. 1 illustrates the process steps in the advantageous system of the present invention.
Figure 1B:
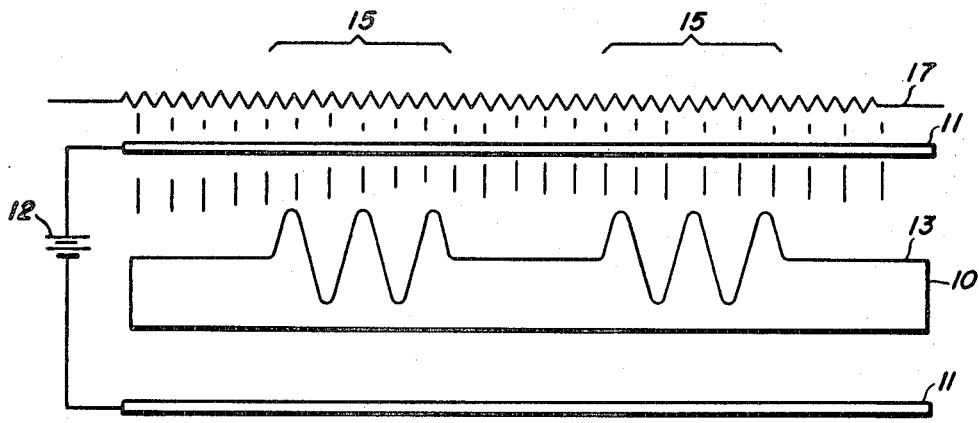

In the advantageous system of the present invention illustrated in FIG. 1, a deformation imaging member 10 shown in cross-section in FIG. 1(a), comprises a softenable deformation layer. A pair of parallel electrodes 11 electrically connected to a source of potential difference 12 provide an electric field in which deformation imaging member 10 is oriented with the lines of force of said field in a direction essentially perpendicular to surface 13 of the deformation imaging member 10, as represented by lines 14. A deformation image is shown in upper surface 13 of deformation imaging member 10 at deformed areas 15, and the imaged areas 15 are separated by non-imaged area 16 wherein the surface of the deformation material is in its original, substantially smooth configuration. In FIG. 1(b), the imaged deformation imaging member 10 is shown in the electric field as described in conjunction with FIG. 1(a), and in addition, the deformation imaging member is illustrated being softened by the application of a suitable medium, here heat from a source such as radiant device 17. Upon the application of heat to the imaged deformation imaging member, while under the influence of the electric field, the wrinkles or folds comprising the deformation image in areas 15, increase in amplitude without deforming areas of the deformation imaging surface 14 which were previously not imaged. In practice, to prevent air breakdown in the parallel plate system, the electrodes 11 may be in very close proximity to the imaging member 10, may have a layer of liquid interposed between the electrodes and the imaging member, or the entire system may be operated in a vacuum.

The surprising results of the advantageous system of the present invention are believed to be a result of the natural tendency of the surface of the softenable material to re-orient into its lowest energy configuration. As described earlier in the descriptions of methods of originally forming such deformation images, in one mode the formation of such images is promoted by the imagewise deformation of the surface of the softenable material in areas where stresses due to the force of an electric field upon charges within the softenable material become greater than the surface tension forces in the material. When such conditions are reached, the surface deforms in an imagewise configuration. The advantageous system of the present invention is a surprising extension of the original imagewise deformation, and is believed to be caused by the natural tendency of the surface of the softenable material to further deform while seeking a lower energy configuration and the natural tendency for such further deformations to occur in a pattern already produced by the initial deformation imaging.

The softenable deformation imaging member 10 in the advantageous system of the present invention may be any material suitable for deformation imaging. For example, such materials include: butyl esters of methyl-B-carboxyethylsiloxanes; beeswax; methyl silicone fluids; methylphenyl silicones; polyesters and other rosin esters, such as Staybelite Ester 10 and others manufactured by the Hercules Powder Co.; polystyrenes and blends including polystyrenes, such as polystyrene: m-terphenyl and a butadiene-styrene copolymer blend; organopolysiloxanes; polyarylene ethers; Piccolastic resins (styrenes), Piccoflex resins (polyvinyl chlorides), Piccolyte resins (terpene resins) and others manufactured by the Pennsylvania Industrial Chemicals Co.; mixtures thereof and others. The above listing of suitable deformation imaging materials is only representative of such materials and is not intended to be a limiting recitation of all suitable materials.

Figure 2A:
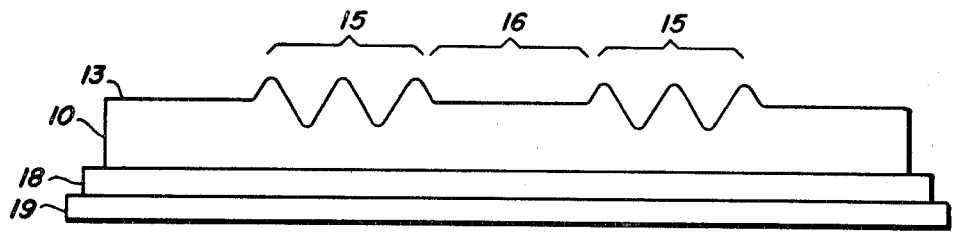
FIG. 2 shows the typical process steps in a preferred embodiment of the advantageous system of the present invention.

In the preferred embodiment of the advantageous system of the present invention illustrated in FIG. 2, a deformation imaging member shown in cross-section in FIG. 2(a), comprises softenable deformation layer 10 overlying a layer of photoconductive material 18 which is coated upon conductive substrate 19. A deformation image is shown in the upper surface 13 of deformation layer 10 at deformed areas 15, and the imaged areas 15 are separated by non-imaged area 16 wherein the surface of the deformation material is in its original, substantially smooth configuration. In FIG. 2(b), the deformation imaging member described in FIG. 2(a) is shown being charged by corona charging device 20. It is noted that the corona charging device is illustrated charging the upper surface 13 of the deformation material 10 with positive charges, while corresponding negative charges are induced at the interface between conductive substrate 19 and photoconductive layer 18. It will be appreciated, however, that the polarities of the charges illustrated may be reversed without impairing the performance of the inventive system. Surface potentials in the range between about 25 to about 500 volts are typically created on the surface of the imaging member by corona charging, and such potentials typically suitable for use in the inventive process.

Figure 2B:
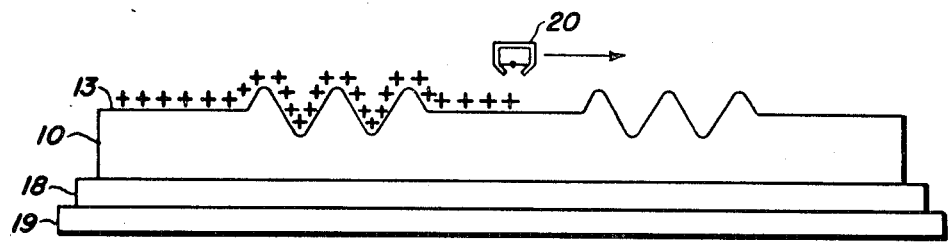
Figure 2C:
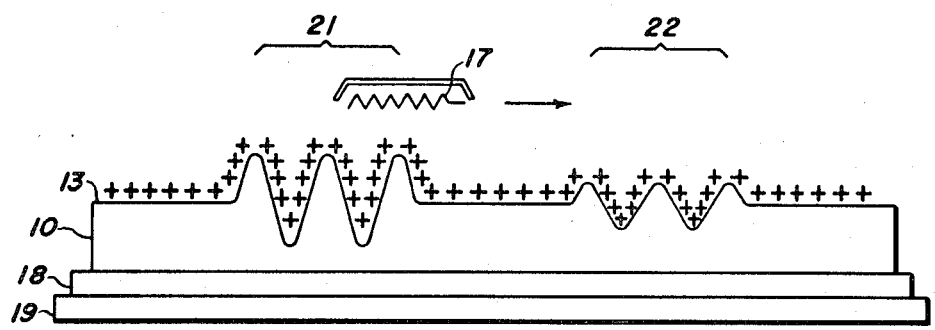

In FIG. 2(c) the uniformly charged deformation imaging member is shown being softened by a suitable softening medium, here heat, generated by heating element 17. Any suitable radiant, conductive or convective heating system can be used to produce the desired softening. For example, even resistance heating using the conductive substrate layer 19 as the resistive heating element may be used.

Figure 2D:
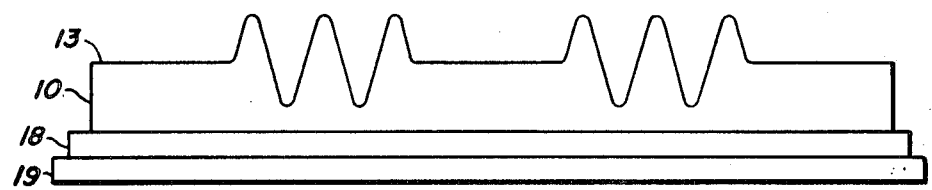

Depending upon the specific materials used, the heat or other softening medium may be applied for time periods ranging from milliseconds to hours, and suitable temperatures will likewise vary with specific materials. The softenable deformation material of layer 10 upon softening by the heat or other suitable medium further deforms in an imagewise configuration as illustrated by the amplified folds or wrinkles shown at 21 which may be compared, for example, with the deformations in that part of the image which have not yet been softened as illustrated at 22. The softened deformation imaging member is then fixed by allowing or causing the softened deformation layer to reharden by removal of heating element 17. The fixing process may also be enhanced by affirmatively cooling the deformation material to a temperature below its melting point. The finished product, an amplified deformation image having deformed, imaged areas with wrinkles or folds of greater aplitude while still having the number of wrinkles or folds per unit area, i.e. the same number of lines per unit area, is illustrated in FIG. 2(d).

The advantageous system of the present invention is apparently limited only by the thickness of the softenable deformation layer in the particular embodiment of the deformation imaging member. It is believed that the valleys, depressions, or pockets between the raised wrinkles or folds in the imaged area of a deformation image, wherein the thickness of the deformation layer has already been reduced by the initial imaging, act as areas of higher local capacitance per unit area than other, thicker areas of the same softenable layer. These thin, high capacitance areas seemingly accept a higher charge density than corresponding thicker areas before a saturation voltage or maximum corona charging voltage is reached. Because of the greater charge density in such depressed areas, it is believed that greater surface deformation pressure exists in those depressed areas than exists in nearby raised areas or smooth areas in the same deformation layer. Therefore, when the deformation layer is softened by the action of heat or vaporous solvent, the stresses induced by the buildup of high charge density areas in the depressions, cause deforming strains which deepen the depressions or pockets and correspondingly increase the height of the wrinkles or folds between such depression.

It is noted that the electric field which was provided in FIG. 1 with a parallel plate capacitor, is provided in the embodiment illustrated in FIG. 2 by the corona charge placed on the surface 13 of the imaging member. The corona charges induce fields across layers 10 and 18. Although the specific embodiment described in conjunction with FIG. 2 comprises a system of single-sided charging of a softenable layer overlying a photoconductor supported by a conductive substrate, it will be appreciated that an electrical field across a deformation imaging member suitable for use in the present inventive system may also be produced by double-sided charging, by a parallel plate capacitor, or by various other means.

Frost imaging is known to occur for various deformation imaging materials when the electrostatic forces on the surface of the softenable layer of the deformation imaging member exceed the surface tension forces at the same surface. It is well known that electrostatic charges present on the surface cause a spreading force on the same surface due to the repulsion of electrical charges of like polarity. So long as the surface tension forces are greater than the forces tending to repel like charges away from each other, the surface remains in its original configuration. However, as the electrical forces at the surface of a deformation imaging layer tending to repel like charges away from each other become equal to, and gradually exceed, the surface tension forces in the same surface, frost imaging begins to occur. The particular set of conditions such as surface potential, temperatures, pressure, deformation layer thickness, and others, at which frost imaging begins to occur, varies depending upon the particular deformable material and may be referred to as a frost threshold.

Another preferred embodiment of the advantageous system of the present invention makes particular use of the frost threshold of any deformation imaging material used therein. This preferred embodiment may also be described in conjunction with the image amplification steps illustrated in FIG. 2. In this system a frost or relief image is provided as shown in FIG. 2(a), having the deformation image in certain areas 15 of the surface of the deformation material, and having other areas 16 in their substantially smooth, initial condition.

The imaged member is then uniformly charged and softened as shown in FIGS. 2(b) and 2(c), respectively.

During the charging and softening steps, the charging voltage, temperature and other conditions are controlled so that areas 16 of the surface of the deformation imaging material remain in their substantially smooth, initial condition; i.e., the conditions are below the frost threshold of the deformation imaging material being used. In this way, amplification of the imaged areas 15 is achieved, as shown in FIG. 2(d).

As noted earlier, the only practical limitation upon the extent of amplification that can be attained by the advantageous system of the present invention is the thickness of the softenable deformation layer in the deformation imaging member. It is clear that this process may be repeated in a cyclical fashion a plurality of times until the desired image amplification is achieved. Indeed, it is typically desirable to repeat the amplification step a plurality of times to achieve the desired deformation image amplification. The viscosity of many deformation imaging materials is such, or may be so adjusted that there is no need to fix the deformation image (i.e., by cooling) between amplification cycles. Such materials are especially suitable for use in the present inventive system.

In an optimized embodiment of the inventive process, the amplification is achieved continuously by continuously applying the field or by continuously electrostatically charging the surface of the imaging member while maintaining the imaged member in the softened condition. In the electrostatic charging mode, continuous charging continuously replenishes the charges on the imaged member, thereby maintaining the different charge concentrations which are believed to be present on the imaged member, as discussed above. These continuous process embodiments eliminate the more involved process of repeating the process steps in cyclical fashion, while still producing desirable results.

It will be appreciated that the process steps of the advantageous system of the present invention of providing an imaged deformation imaging member in an electric field and softening said member, may, depending upon the specific deformation imaging material used in particular embodiments of deformation imaging systems, typically be performed simultaneously or in any order, so long as there is a coincidence of a softened, deformable member in the electric field sometime during the amplification process.

The following examples further specifically define the present invention with respect to a system which when used in conjunction with deformation images provides for the imagewise amplification of such images. The parts and percentages are by weight unless otherwise indicated. The examples below are intended to illustrate various preferred embodiments of the deformation imaging system of this invention.

Example I

A deformation imaging member suitable for use in the present invention is prepared by making a solution of the photoconductor, 2,5-bis(p-aminophenyl)-1,3,4-oxadiazole and a resinous binder material vinylite VYNS, a copolymer of vinylchloride and vinylacetate, available from Carbide and Carbon Chemicals Company, in diazo ketone in proportions of about 30 grams of the photoconductor to about 30 grams of the VYNS to about 300 milliliters of the diazo ketone. A film of the photoconductor solution is applied to an aluminized "Mylar," polyethylene terephthalate substrate, available from E. I. du Pont de Nemours & Co., and spread evenly thereon using a gravure roller. The photoconductive solution dries to a thickness of about 10 microns. About thirty seconds after coating the photoconductor onto the conductive substrate, the coated Mylar is placed in an oven at about 80° C. for about two hours. This member is then removed from the oven, allowed to cool, and the photoconductor is overcoated with a solution of softenable deformation imaging material, "Staybelite Ester 10," a resin ester available and Hercules Powder Company.

A deformation image is then produced in the softenable material of the deformation imaging member by conventional deformation imaging techniques. The imaged member is then uniformly charged using a corona charging device, a Corotron manufactured by the Xerox Corporation, Rochester, N.Y. The uniformly charged, imaged member is exposed to heat from a radiant electric heating device for a few minutes, thereby allowing the deformation image to amplify. The imaging member is then allowed to cool.

The original deformation image which is very weak and visible only with phase contrast microscopy, is amplified to the point where it may now be seen easily in either a bright or dark field. The amplitude of the original deformation image increases while maintaining the same number of lines per unit length in said deformation image.

Example II

Using a deformation imaging member and the deformation imaging amplification steps as described in Example I, the deformation image amplification is carried out a number of times on the same imaged member, each time sequentially increasing the amplitude of the deformation image.

Example III

Using a deformation imaging member and a deformation image amplification system as described in Example I, the deformation image amplification is carried out in a process wherein the deformation imaging member is uniformly charged by the corona charging device while said deformation imaging member is simultaneously in the presence of the softening heat created by the radiant electric heating device. This system for performing the steps of applying the field and applying the softening medium simultaneously or, alternatively, in the opposite order, gives an amplified deformation imaging member as described in Example I.

Example IV

An imaged deformation imaging member which is to be amplified is provided as described in Example I. Using the aluminized Mylar substrate as one electrode, a second electrode, a plate of stainless steel, is placed over the imaged deformation layer, and closely spaced about a few microns from the deformation material. A high dielectric silicone oil, an organosiloxane polymer having a high dielectric strength, is introduced between the upper electrode and the deformation material. This dielectric liquid helps prevent breakdown of the field across the parallel plate system. The electrodes are electrically connected to a source of potential to produce an electrical field having a field strength of about 100 volts per micron across the thickness of the deformation imaging member. The imaging member is then heated with a radiant electric heating unit placed close to the Mylar substrate. Heat is applied for a few minutes thereby allowing the deformation material to soften, and the desired amplification of the deformation image is achieved. The image is amplified while maintaining substantially the same number of lines per unit length.

Example V

A deformation imaging member is prepared in the following manner: A substrate made up of an about 500 A. thick layer of tin oxide residing on an approximately 1/8" thick glass layer is provided and an approximately 4.5 micron thick layer of a photoconductor made up of poly-n-vinylcarbazole sensitized with Brilliant Green dye is formed on the tin oxide surface of the substrate. An approximately 0.2 micron thick layer of Piccopale H–2, a deformable thermoplastic material commercially available from the Pennsylvania Industrial Chemical Corp., Clairton, Pa. and which has a Ball and Ring melting point of 96–98° C., is formed on the surface of the photoconductive material layer. The active area of the imaging member is about 1¼" in diameter.

A hologram is then formed in the deformation imaging member as follows: The thermoplastic layer of the imaging member is charged with a scanning Corotron to produce a uniform electric fiield of about 50 volts/micron across the thermoplastic and photoconductive layers. The imaging member is then exposed to a holographic interference pattern formed using a Model 120 Helium-Neon continuous wave laser (available from Spectra Physics Corp., Mountain View, Calif.). The thermoplastic layer of the imaging member is then charged with a scanning corotron to produce a uniform electric field of about 50 volts/micron across the thermoplastic and photoconductive layers. The hologram is then heat developed by bringing the imaging member into proximity with, i.e. spaced about 7 mils apart from, a hot transparent planar surface maintained at a temperature of about 85° C. During the period that the imaging member is being heated, the active area of the imaging member is continuously scanned at a rate of one time per second with a readout light from a Model 133 Helium-Neon laser (available from Spectra Physics Corp.). One first order diffracted intensity is continuously measured with a photocell and the output from the photocell is applied to an oscilloscope and displayed.

The imaging member is maintained in proximity with the hot planar surface for about 580 seconds at which time the hologram reaches its maximum deformation magnitude. The imaging member is then quickly cooled by removing it from the hot planar surface and spraying the bottom of the substrate with cold air. The hologram formed in the thermoplastic layer of the imaging member is found to have a maximum Diffraction Efficiency (D.E.) of about 0.5% for one first order diffracted intensity where $$DE = \frac{\text{One first order intensity}}{\text{Total light intensity transmitted through the member}} \times 100$$

Example VI

The surface deformations which make up the hologram of the imaged member described in Example V are amplified in the following manner: The thermoplastic layer surface of the imaged member is charged with a scanning Corotron to produce a uniform electric field of about 50 volts/micron across the thermoplastic and photoconductive layers. The imaged member is then spaced about 7 mils apart from a hot transparent planar surface maintained at a temperature of about 85° C. for period of about 465 seconds. During this time the hologram is scanned with a readout light and one first order diffracted intensity is measured as described in Example V. The imaged member is then removed and quickly cooled as previously described. The hologram is measured to have a maximum diffraction Efficiency of about 4.0% for one first order diffracted intensity.

Example VII

The imaged member obtained in Example VI is charged with a scanning Corotron to produce an electric field of about 50 volts/micron across the thermoplastic and photoconductive layers. The imaged member is then spaced about 7 mils apart from the about 85° C. planar surface for about 335 seconds during which time it was monitored as described above. The imaged member is then removed and quickly cooled. The hologram is measured to have a maximum Diffraction Efficiency of about 4.75% for one first order diffracted intensity.

Example VIII

The imaged member obtained in Example VII is charged with a scanning Corotron to produce an electric field of about 50 volts/micron across the thermoplastic and photoconductive layers. The imaged member is then spaced about 7 mils apart from the 85° C. planar surface for about 340 seconds during which time it is monitored as described above, then removed and quickly cooled. The hologram is measured to have a maximum Diffraction Efficiency of about 6.25% for one first order diffracted intensity.

Although specific components, proportions and procedures have been stated in the above description of the preferred embodiments of the novel deformation image amplification system, other suitable materials, as listed above, may be used with similar results. In addition, it may be that other substances exist or may be discovered that have some or enough of the properties of the particular substances described herein to be used as substitutes, or that other materials and procedures may be employed to synergize, enhance or otherwise modify the novel deformation image amplification system.

Such other modifications and ramifications of the present invention will occur to those skilled in the art upon a reading of this disclosure. These are intended to be included within the scope of this invention.

What is claimed is:

1. A method of amplifying a deformation image in a softenable deformation imaging material comprising:
   (a) providing an imaged member comprising a layer of softenable deformation imaging material having a deformation image in one surface of said layer;
   (b) providing an electric field across the thickness of said layer of imaging material;
   (c) softening the softenable material until the amplitude of the surface deformations comprising said deformation image is increased; and
   (d) ceasing said softening while the amplitude of the surface deformations comprising said deformation image is increased and
   wherein the strength of said electric field and the duration of said softening step are such that the deformation image is not erased.

2. The method of amplifying a deformation image comprising the method of claim 1 and repeating steps (b) and (c) of claim 1 a plurality of times upon the same imaging member.

3. The method of amplifying a deformation image comprising the method of claim 1 and thereafter fixing said amplified image by rehardening said imaging material.

4. The method of claim 1 wherein step (c) is performed after step (b).

5. The method of claim 1 wherein steps (b) and (c) are performed simultaneously.

6. The method of claim 1 wherein the electric field across the layer of imaging material is provided by electrically charging the surface of said layer of imaging material.

7. The method of claim 6 wherein the electric field across the layer of imaging material is provided by electrically charging the surface of said layer of imaging material having the deformation image therein.

8. The method of claim 7 wherein the surface of said layer of imaging material is electrically charged to a surface potential in the range between about 25 and about 500 volts.

9. The method of amplifying a deformation image comprising repeating steps (b) and (c) of the method of claim 7 a plurality of times upon the same imaging member.

10. The method of continuously amplifying a deformation image comprising simultaneously and continuously performing steps (b) and (c) of the method of claim 7.

11. The method of amplifying a deformation image comprising simultaneously performing steps (b) and (c) of the method of claim 7.

12. The method of claim 1 wherein step (b) comprises providing a pair of electrodes, each of which is on one side of the layer of deformation imaging material and is substantially parallel to the surface of the layer of deformation imaging material.

13. The method of claim 12 wherein a high dielectric liquid fills any space between the electrode on the side of the layer of deformation material having the deformation image therein, and the surface of the layer of deformation material having the deformation image therein.

14. The method of claim 7 wherein the surface of the imaging material is electrically charged by corona charging said surface.

References Cited
UNITED STATES PATENTS

| | | | |
|---|---|---|---|
| 3,196,008 | 7/1965 | Mihajlov et al. | 96—1.1 X |
| 3,245,053 | 4/1966 | Brown et al. | 96—1.1 X |
| 3,318,698 | 5/1967 | Schwertz | 96—1.1 |
| 3,333,958 | 8/1967 | Giaimo | 96—1.1 |
| 3,560,206 | 2/1971 | Jvirblis | 96—1.1 |
| 3,560,205 | 2/1971 | Urbach | 96—1.1 |
| 3,698,892 | 10/1972 | Heurtley | 96—1.1 |

NORMAN G. TORCHIN, Primary Examiner

JOHN R. MILLER, Assistant Examiner

U.S. Cl. X.R.

178—6.6 TP; 264—25; 340—173 TP; 346—74 TP, 77 E; 350—3.5; 355—9